(12) United States Patent
Nakagawa et al.

(10) Patent No.: US 11,580,468 B2
(45) Date of Patent: Feb. 14, 2023

(54) INFORMATION PROCESSING APPARATUS

(71) Applicant: NTT DOCOMO, INC., Tokyo (JP)

(72) Inventors: Hiroshi Nakagawa, Tokyo (JP);
Kazuhiro Yamada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 200 days.

(21) Appl. No.: 16/756,614

(22) PCT Filed: Nov. 16, 2018

(86) PCT No.: PCT/JP2018/042451
§ 371 (c)(1),
(2) Date: Apr. 16, 2020

(87) PCT Pub. No.: WO2019/116823
PCT Pub. Date: Jun. 20, 2019

(65) Prior Publication Data
US 2020/0320460 A1      Oct. 8, 2020

(30) Foreign Application Priority Data

Dec. 15, 2017 (JP) .............................. JP2017-240751

(51) Int. Cl.
| | | |
|---|---|---|
| G06Q 10/06 | (2012.01) | |
| G05D 1/00 | (2006.01) | |
| G08G 5/00 | (2006.01) | |
| G06Q 10/0631 | (2023.01) | |
| G06Q 10/0639 | (2023.01) | |

(52) U.S. Cl.
CPC ... *G06Q 10/063112* (2013.01); *G05D 1/0038* (2013.01); *G06Q 10/06398* (2013.01); *G08G 5/003* (2013.01); *G08G 5/0069* (2013.01)

(58) Field of Classification Search
None
See application file for complete search history.

(56) References Cited

U.S. PATENT DOCUMENTS 11,100,589 B1 *   8/2021   Binion .................... G07C 5/008
2006/0142903 A1 *  6/2006   Padan .................... G08G 5/045
                                                                701/3
(Continued)

FOREIGN PATENT DOCUMENTS

JP        2014104797 A     6/2014
WO    WO-2013151554 A1 *  10/2013    ......... G01S 13/9303
(Continued)

OTHER PUBLICATIONS

Carretta, Thomas R., and Malcolm James Ree. "Pilot selection methods." (2003). (Year: 2003).*
(Continued)

*Primary Examiner* — Thomas L Mansfield
(74) *Attorney, Agent, or Firm* — Dilworth IP, LLC

(57) ABSTRACT

An information processing apparatus includes an accumulation unit that accumulates history information regarding a flight history of an aircraft. A specification unit, based on the history information accumulated by the accumulation unit, specifies a candidate to be an operation assistant who assists an operation planned by an assisted operator. An output unit outputs information regarding the candidate to be the operation assistant specified by the specification unit.

12 Claims, 8 Drawing Sheets

(56) References Cited

U.S. PATENT DOCUMENTS

| | | | |
|---|---|---|---|
| 2010/0121575 A1* | 5/2010 | Aldridge | G08G 5/045 |
| | | | 701/301 |
| 2014/0212847 A1* | 7/2014 | Holder | G09B 19/165 |
| | | | 434/35 |
| 2017/0154339 A1 | 6/2017 | Kimberlin | |
| 2019/0033862 A1* | 1/2019 | Groden | G08G 5/0086 |
| 2020/0388165 A1* | 12/2020 | Lubrano | G08G 5/0082 |

FOREIGN PATENT DOCUMENTS

| | | | |
|---|---|---|---|
| WO | 20170044485 A1 | 3/2017 | |
| WO | WO-2018203214 A1 * | 11/2018 | G08G 5/0013 |

OTHER PUBLICATIONS

Hoermann, Hans-Juergen, and Panja Goerke. "Assessment of social competence for pilot selection." The International Journal of Aviation Psychology 24.1 (2014): 6-28. (Year: 2014).*

Rose, Mark R., et al. "Early identification of unmanned aircraft pilots using measures of personality and aptitude." The International Journal of Aviation Psychology 24.1 (2014): 36-52. (Year: 2014).*

Barron, Laura G., Thomas R. Carretta, and Mark R. Rose. "Aptitude and trait predictors of manned and unmanned aircraft pilot job performance." Military Psychology 28.2 (2016): 65-77. (Year: 2016).*

International Search Report issued in corresponding PCT Application No. PCT/JP2018/042451, dated Feb. 12, 2019, 2 pages.

Notice for Reasons for Refusal issued in corresponding Japanese Patent Application No. 2019-558985, dated Sep. 21, 2021.

* cited by examiner

| OPERATOR ID (OPERATION ASSISTANT ID) | FLIGHT DATE AND TIME | AIR-CRAFT MODEL | FLIGHT PURPOSE | FLIGHT TIME | FLIGHT ROUTE | FLIGHT ENVIRON-MENT | FLIGHT PATTERN |
|---|---|---|---|---|---|---|---|
| U001 (H001) | 2017/1/15 | D001125 | PRACTICE | 0.5 HOURS | ... | WIND SPEED 2 M | TOUR |
|  | 2017/1/16 | D001126 | EVENT PHOTOGRA-PHY | 1 HOUR | ... | WIND SPEED 3 M | TOUR |
|  | ... | ... | ... | ... | ... | ... | ... |

| OPERATOR ID (OPERATION ASSISTANT ID) | IMAGE DATA DURING FLIGHT | IMAGE APPLI-CATION | ACCIDENT PRESENCE /ABSENCE | ASSISTANCE PRESENCE/AB-SENCE (IF PRESENT, OPERATION ASSISTANT ID) | OPERA-TION ABILI-TY LEVEL | OPERA-TION ASSIS-TANCE ABILITY LEVEL |
|---|---|---|---|---|---|---|
| U001 (H001) | ... | PRACTICE | ABSENT | ABSENT | 6 | 4 |
|  | ... | RECORD-ING | ABSENT | PRESENT (H012) |  |  |
|  | ... | ... | ... | ... |  |  |

FIG. 7A

| OPERATION ASSISTANCE ABILITY LEVEL | VALUE |
|---|---|
| 1 | — |
| 2 | — |
| 3 | — |
| 4 | 1000 yen per hour |
| 5 | 2000 yen per hour |
| 6 | 4000 yen per hour |
| 7 | 6000 yen per hour |
| 8 | 8000 yen per hour |
| 9 | 15000 yen per hour |
| 10 | 20000 yen per hour |

FIG. *7B*

| ALTITUDE | DISPLAY TARGET IMAGE |
|---|---|
| AT LEAST H | AIRCRAFT VIEWPOINT IMAGE |
| LESS THAN H | OPERATOR VIEWPOINT IMAGE |

| ATTITUDE | DISPLAY TARGET IMAGE |
|---|---|
| INCLINATION AT LEAST U | OPERATOR VIEWPOINT IMAGE |
| INCLINATION LESS THAN U | AIRCRAFT VIEWPOINT IMAGE |

| MOTOR SPEED | DISPLAY TARGET IMAGE |
|---|---|
| AT LEAST M | OPERATOR VIEWPOINT IMAGE |
| LESS THAN M | AIRCRAFT VIEWPOINT IMAGE |

| SPEED | DISPLAY TARGET IMAGE |
|---|---|
| AT LEAST V | AIRCRAFT VIEWPOINT IMAGE |
| LESS THAN V | AIRCRAFT VIEWPOINT IMAGE |

| REMAINING BATTERY LEVEL | DISPLAY TARGET IMAGE |
|---|---|
| AT LEAST E | AIRCRAFT VIEWPOINT IMAGE |
| LESS THAN E | OPERATOR VIEWPOINT IMAGE |

| DISTANCE FROM WORK TARGET | DISPLAY TARGET IMAGE |
|---|---|
| AT LEAST L | OPERATOR VIEWPOINT IMAGE |
| LESS THAN L | AIRCRAFT VIEWPOINT IMAGE |

FIG. 8

INFORMATION PROCESSING APPARATUS

TECHNICAL FIELD

The present invention relates to assistance for an operator of an aircraft.

BACKGROUND ART

As a technique for controlling an aircraft, for example, in JP-2014-104797A, a mechanism is disclosed whereby, by following light emitted from a light emitting body provided in the aircraft with a camera provided on a moving mechanism, an image of a flight state of the aircraft is captured, and that captured image is displayed at a remote location.

SUMMARY OF INVENTION

In recent years, various services using aircraft called drones are becoming widespread. In such circumstances, for example, a mechanism has been conceived whereby operation is remotely assisted for an operator who is unfamiliar with operation of the aircraft. Accordingly, the present invention provides a mechanism whereby it is possible to match the operator who operates the aircraft with an operation assistant who assists that operation.

The present invention provides an information processing apparatus including: an accumulation unit that accumulates history information regarding a flight history of an aircraft; a specification unit that, based on the history information accumulated by the accumulation unit, specifies a candidate to be an operation assistant who assists an operation planned by an assisted operator; and an output unit that outputs information regarding the candidate to be the operation assistant specified by the specification unit.

Also, a configuration may be adopted in which the specification unit obtains an operation ability level and an operation assistance ability level of each operator based on the history information accumulated by the accumulation unit, and the specification unit specifies an operator who has an operation assistance ability level corresponding to the operation ability level of the assisted operator as the candidate to be the operation assistant.

A configuration may be adopted in which an operation assistance ability level of the operation assistant is determined for each of a plurality of flight conditions, and the specification unit specifies the candidate to be the operation assistant based on an operation assistance ability level corresponding to a flight condition in the operation planned by the assisted operator.

A configuration may be adopted in which an operation ability level of the assisted operator is determined for each of a plurality of flight conditions, and the specification unit specifies the candidate to be the operation assistant based on an operation ability level corresponding to a flight condition in the operation planned by the assisted operator.

A configuration may be adopted in which the output unit preferentially outputs a plurality of candidates to be the operation assistant that have been specified by the specification unit, in an order according to a flight condition in the operation planned by the assisted operator.

A configuration may be adopted in which the information processing apparatus includes: a storage unit that stores an assistance condition of assistance between the assisted operator and the operation assistant; and a release unit that, when an operation to be performed by the assisted operator does not match the assistance condition stored in the storage unit, performs processing to release operation assistance by the operation assistant.

A configuration may be adopted in which the output unit generates information regarding a value of operation assistance by the operation assistant, and outputs the generated information to a communications device of the operation assistant or the assisted operator.

A configuration may be adopted in which the accumulation unit accumulates, as the history information, information regarding evaluation from the assisted operator to the operation assistant, or information regarding evaluation from the operation assistant to the assisted operator.

A configuration may be adopted in which the specification unit specifies a candidate to be the operation assistant for each operation technique included in the operation planned by the assisted operator.

According to the present invention, it is possible to match an operator who operates an aircraft with an operation assistant who assists that operation.

BRIEF DESCRIPTION OF DRAWINGS

FIG. 7A is a diagram showing an example of history information in accordance with the present invention.

FIG. 7B is a diagram showing an example of a value table in accordance with the present invention.

FIG. 8 is a diagram showing an example of a display image determination table in accordance with the present invention.

DETAILED DESCRIPTION OF THE PREFERRED EMBODIMENTS

Figure 1:
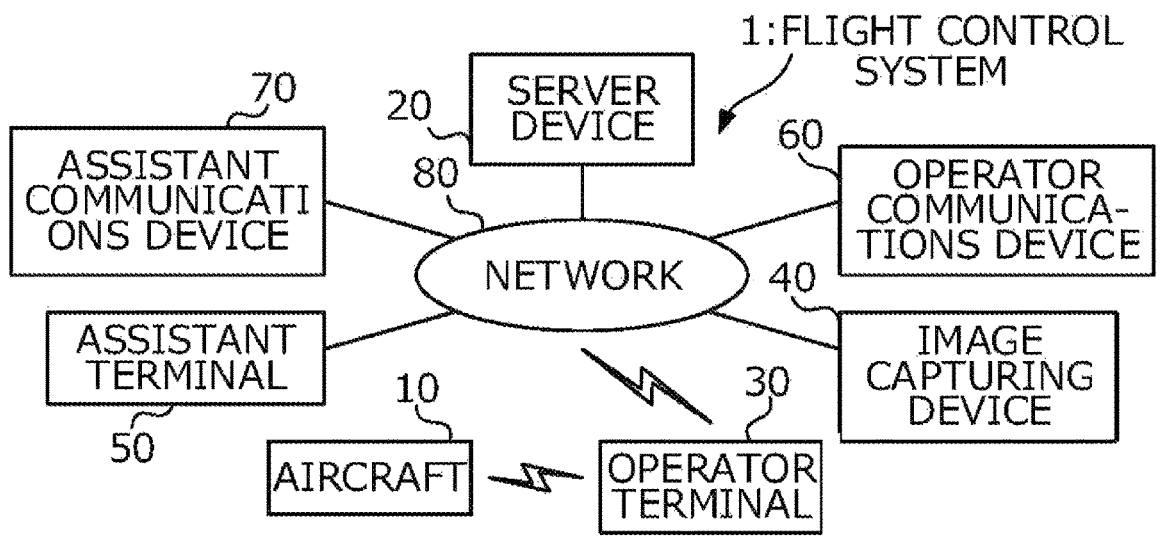
FIG. 1 is a diagram showing an example of the configuration of flight control system 1 in accordance with the present invention.

FIG. 1 is a diagram showing an example of the configuration of flight control system 1. Flight control system 1 is a system for controlling flight of aircraft 10, and particularly realizes matching of an operator who operates aircraft 10 with an operation assistant who assists that operation. As shown in FIG. 1, flight control system 1 includes aircraft 10, server device 20, operator terminal 30, image capturing device 40, assistant terminal 50, operator communications device 60, assistant communications device 70, and network 80. Aircraft 10, for example, is a device capable of flight called a drone, and is provided with an image capturing function of capturing an image of the surroundings of aircraft 10 with a moving image. The image captured by the image capturing function is an image when aircraft 10 is viewed from a viewpoint, and is hereinafter referred to as an aircraft viewpoint image.

Operator terminal 30 is a terminal for an operator to operate aircraft 10 while visually recognizing aircraft 10. Operator terminal 30 is wirelessly connected to aircraft 10, and transmits a wireless signal according to operation by the operator to aircraft 10 to instruct operation of aircraft 10.

Image capturing device 40 is, for example, a camera, and captures an image of how aircraft 10 is flying using a moving image. Image capturing device 40 has a pan/tilt function. For example, the captured image is analyzed by an image recognition technology to recognize aircraft 10 in the captured image, and by controlling the pan/tilt function, it is possible to change the direction of image capturing such that aircraft 10 is tracked and an image of aircraft 10 is captured. Image capturing device 40 may be a fixed image capturing device installed on the ground below the flight airspace of aircraft 10, or may be a portable image capturing device that can be carried by a human. In the present embodiment, image capturing device 40 is portable, and is placed beside the operator when capturing an image of space including aircraft 10. The image captured by image capturing device 40 is substantially equal to the field of view when viewing flight of aircraft 10 from the viewpoint of the operator, and is hereinafter referred to as an operator viewpoint image.

Assistant terminal 50 is a terminal operated by an operation assistant who remotely assists operation by an operator. Assistant terminal 50 has a display function, and can display an above-mentioned aircraft viewpoint image or operator viewpoint image. The operation assistant operates assistant terminal 50 while viewing this image to assist operation by the operator.

Operator communications device 60 is a device for the operator to perform communications. Assistant communications device 70 is a device for the operation assistant to perform communications. Server device 20 is interposed between operator communications device 60 and assistant communications device 70, and thus the operator and the operation assistant are matched to each other.

Server device 20 is an information processing device that functions as a control platform that controls flight of aircraft 10, and includes, as characteristic processing, processing related to matching an operator with an operation assistant, and processing related to operation assistance to the operator by the operation assistant. In the processing related to matching an operator with an operation assistant, server device 20 accumulates history information regarding the flight history of aircraft 10, and extracts a candidate to be the operation assistant based on this history information. Also, although various methods of operation assistance are conceivable, in the present embodiment, as one example of such operation assistance, a method is adopted in which among aircraft viewpoint images captured by the image capturing function of aircraft 10, and operator viewpoint images obtained by capturing how aircraft 10 flies with image capturing device 40, any of these viewpoint images is preferentially displayed in assistant terminal 50. Here, displaying preferentially means displaying one captured image to be displayed preferentially on assistant terminal 50 so that a user can easily, or in an easily understood manner, view the captured image compared to another captured image. For example, this includes a mode in which one captured image to be displayed preferentially is displayed and the other captured image is not displayed, a mode in which one captured image to be displayed preferentially is displayed larger than the other captured image, a mode in which one captured image to be displayed preferentially is displayed earlier in time than the other captured image, or a mode in which one captured image to be displayed preferentially is displayed visually emphasized more than the other captured image.

Server device 20, operator terminal 30, image capturing device 40, assistant terminal 50, operator communications device 60, and assistant communications device 70 are each connected in a wired or wireless manner so as to be capable of communicating with network 80.

Figure 2:
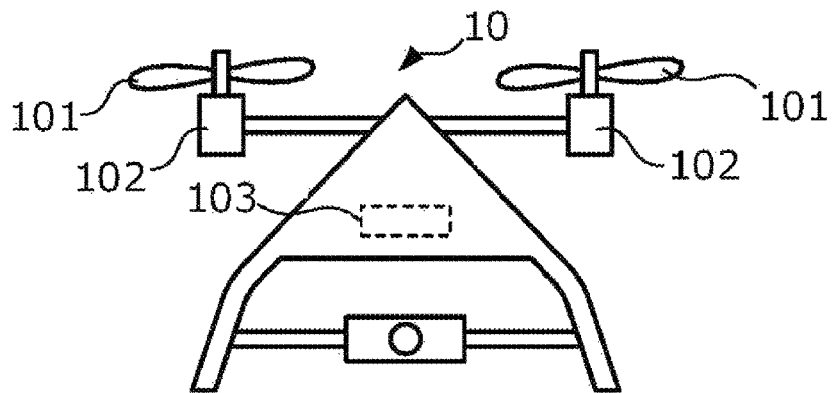
FIG. 2 is a diagram showing an example of the outer appearance of aircraft 10 in accordance with the present invention.

FIG. 2 is a diagram showing an example of the outer appearance of aircraft 10. Aircraft 10 is, for example, a so-called drone, and includes propellers 101, driving devices 102, and battery 103.

Propellers 101 rotates around an axis. Aircraft 10 flies due to rotation by propellers 101. Driving devices 102 rotate propellers 101 by applying power. Driving devices 102 include, for example, motors and transmission mechanisms that transmit power of the motors to propellers 101. Battery 103 supplies power to each part of aircraft 10 including driving devices 102.

Figure 3:
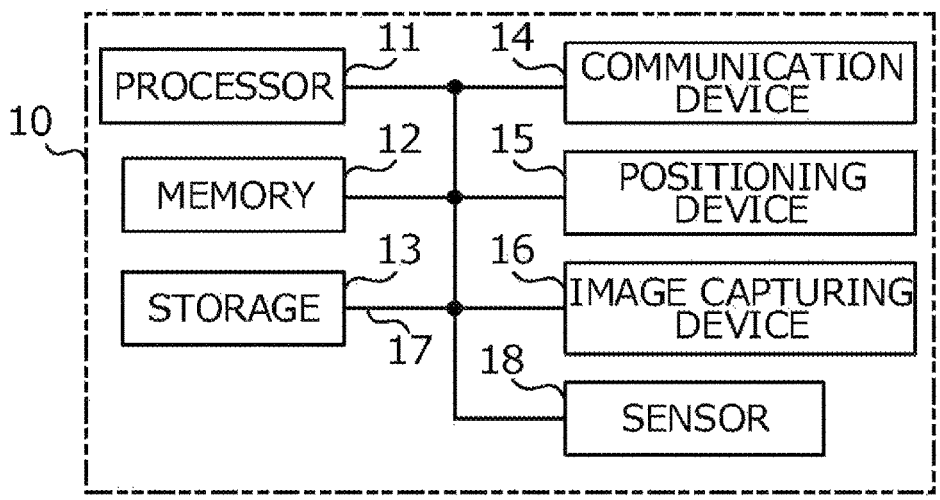
FIG. 3 is a diagram showing a hardware configuration of aircraft 10 in accordance with the present invention.

FIG. 3 is a diagram showing a hardware configuration of aircraft 10. Aircraft 10 is physically configured as a computer device including processor 11, memory 12, storage 13, communications device 14, positioning device 15, image capturing device 16, sensor 18, bus 17, and the like. Note that in the following description, the term "device" can be read as a circuit, a device, a unit, or the like.

Processor 11 controls, for example, an entire computer by operating an operating system. Processor 11 may be configured by a central processing device (CPU: Central Processing Unit) that includes an interface to a peripheral device, a control device, an arithmetic device, a register, and the like.

Also, processor 11 reads out a program (program code), a software module and data from storage 13 and/or communications device 14 to memory 12, and executes various processes according to these. A program that causes a computer to execute at least a part of the operation of aircraft 10 is used as the program. Various processing executed in aircraft 10 may be executed by one processor 11, or may be executed simultaneously or sequentially by two or more processors 11. Processor 11 may be implemented with one or more chips. Note that the program may be transmitted from a network through a telecommunications line.

Memory 12 is a computer-readable recording medium, and for example, may be configured with at least one of a ROM (Read Only Memory), an EPROM (Erasable Programmable ROM), an EEPROM (Electrically Erasable Programmable ROM), and a RAM (Random Access Memory), and the like. Memory 12 may be called a register, a cache, a main memory (main storage device), or the like. Memory 12 can save a program (program code), a software module, and the like that can be executed to implement the flight control method according to one embodiment of the present invention.

Storage 13 is a computer-readable recording medium, and for example, may be configured with at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, or the like. Storage 13 may be called an auxiliary storage device.

Communications device 14 is hardware for performing wireless communications with operator terminal 30.

Positioning device 15 measures the three-dimensional position of aircraft 10. Positioning device 15 is, for example, a GPS (Global Positioning System) receiver, and measures the current position of aircraft 10 based on GPS signals received from a plurality of satellites.

Image capturing device 16 captures an image of the surroundings of aircraft 10. Image capturing device 16 is, for example, a camera, and captures an image by forming an image on an image capturing element using an optical system. Image capturing device 16 captures an image of a predetermined range in front of aircraft 10, for example. However, the image capturing direction of image capturing device 16 is not limited to the front of aircraft 10, but may be above, below, or behind aircraft 10. Further, the image capturing direction may be changed by, for example, rotating a pedestal that supports the image capturing device 16.

Sensor 18 is a device for detecting various states of aircraft 10. For example, the altitude of aircraft 10, the speed of aircraft 10, the attitude of aircraft 10, the remaining battery level of aircraft 10, the motor speed of aircraft 10, the distance between aircraft 10 and a work target, and the like are detected. The work target is, for example, a building when aircraft 10 flies to capture an image of the building.

Devices such as processor 11 and memory 12 described above are connected by a bus 17 for communicating information. Bus 17 may be configured with a single bus, or may be configured with different buses between devices.

Operator terminal 30 is physically configured as a computer device that includes a processor, a memory, a storage, a first communications device, a second communications device, a UI (User Interface) unit, a bus, and the like. The first communications device performs wireless communications with communications device 14 of aircraft 10. The second communications device performs communications through network 80. The UI unit is provided with a display unit that includes, for example, a liquid crystal panel and a liquid crystal driving circuit, and displays an image corresponding to image data, and is also provided with an operation unit that includes operation elements such as a key or a touch sensor, and receives a user operation and supplies a signal corresponding to the operation to the processor. Other than these, the processor, memory, storage, and bus are the same as the above-described processor 11, memory 12, storage 13, and bus 17, and thus description thereof is omitted here.

Assistant terminal 50 is physically configured as a computer device including a processor, a memory, a storage, a communications device, a UI unit, a bus, and the like. The communications device communicates with server device 20 through network 80. Other than these, the processor, memory, storage, and bus are the same in hardware as the above-described processor 11, memory 12, storage 13, and bus 17, and thus description thereof is omitted here.

Figure 4:
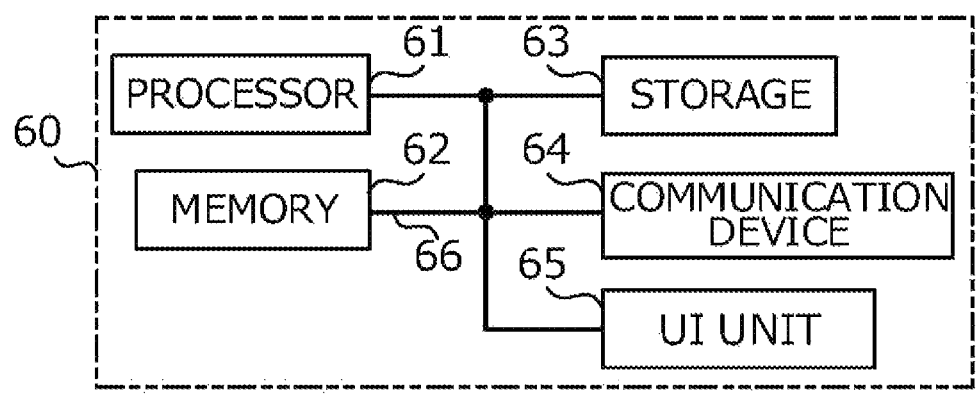
FIG. 4 is a diagram showing a hardware configuration of operator communications device 60 in accordance with the present invention.

FIG. 4 is a diagram showing a hardware configuration of operator communications device 60. Operator communications device 60 is physically configured as a computer device that includes processor 61, memory 62, storage 63, communications device 64, UI unit 65, bus 66, and the like. UI unit 65 is provided with a display unit that includes, for example, a liquid crystal panel and a liquid crystal driving circuit, and displays an image corresponding to image data, and is also provided with an operation unit that includes operation elements such as a key or a touch sensor, and receives a user operation and supplies a signal corresponding to the operation to processor 61. Communications device 64 performs communications through network 80. Other than these, processor 61, memory 62, storage 63, and bus 66 are the same in hardware as the above-described processor 11, memory 12, storage 13, and bus 17, and thus description thereof is omitted here.

Figure 5:
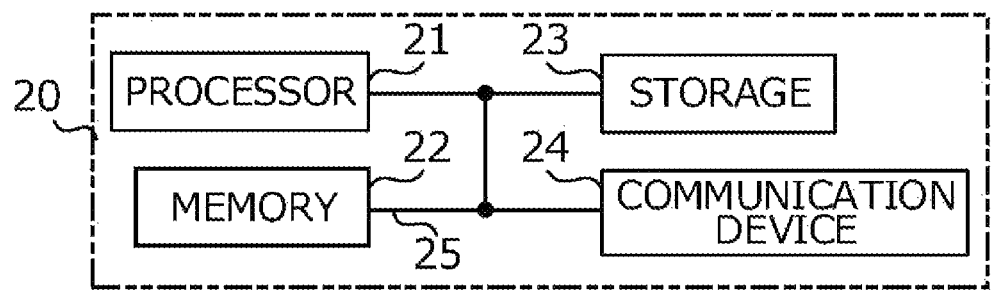
FIG. 5 is a diagram showing a hardware configuration of server device 20 in accordance with the present invention.

FIG. 5 is a diagram showing a hardware configuration of server device 20. Server device 20 is physically configured as a computer device that includes processor 21, memory 22, storage 23, communications device 24, bus 25, and the like. Communications device 24 performs communications through network 80. Other than these, processor 21, memory 22, storage 23, and bus 25 are the same in hardware as the above-described processor 11, memory 12, storage 13, and bus 17, and thus description thereof is omitted here.

Figure 6:
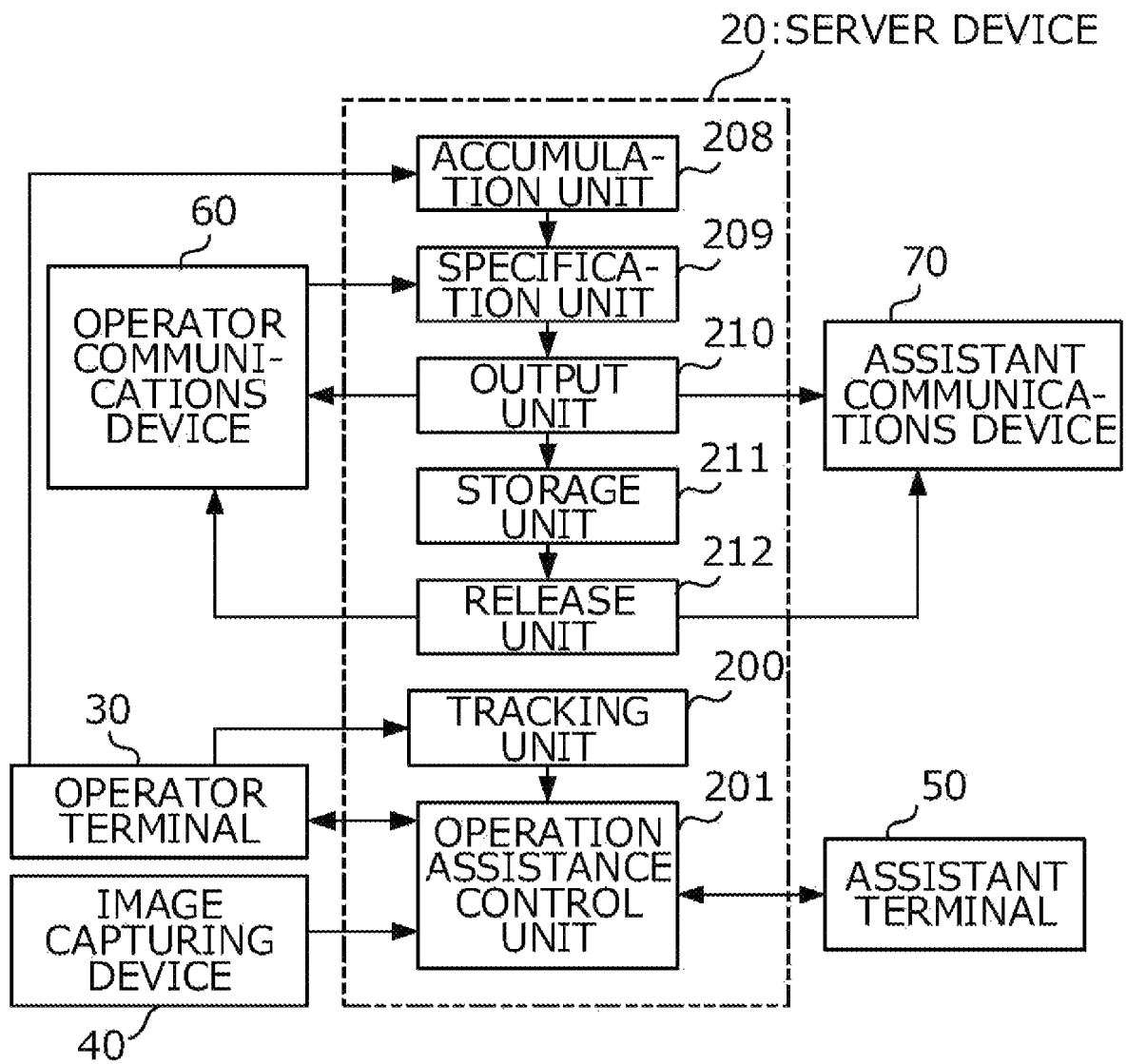
FIG. 6 is a diagram showing an example of a functional configuration of server device 20 in accordance with the present invention.

FIG. 6 is a diagram showing an example of a functional configuration of server device 20. The respective functions of server device 20 are realized, by reading predetermined software (a program) on hardware such as processor 21 and memory 22, by processor 21 performing an arithmetic operation to control communications by communications device 24, and data reading and/or writing in memory 22 and storage 23.

In FIG. 6, tracking unit 200 records the aircraft identification information and flight status of aircraft 10 under the control of server device 20. The flight status includes the position where aircraft 10 is flying and the date/time at that position. Tracking unit 200 records the position information and the date/time information transmitted from aircraft 10 through operator terminal 30. In addition, tracking unit 200 determines whether or not the position information and the date/time information are within a flight plan that was planned in advance, and records the result of that determination.

Accumulation unit 208 accumulates history information regarding the flight history of aircraft 10. The history information includes a history of operation of aircraft 10 by an operator (hereinafter, referred to as an assisted operator) to be matched by server device 20, and a history of operation of aircraft 10 by an operation assistant to be matched by server device 20 when the operation assistant served as the operator of aircraft 10. That is, in the history information, both the assisted operator and the operation assistant are treated as operators.

FIG. 7A is a diagram showing an example of history information. The history information includes, for each operator ID of the operator who operated aircraft 10, for each respective flight, the flight date/time, aircraft model, flight purpose, flight time, flight path (three-dimensional position information including height), flight environment (wind speed, temperature, humidity, and the like), flight pattern (destination flight type, tour type, vertical movement type, and the like), flight image capturing data which is data captured during flight, image application which is the application of flight image capturing data captured during that flight, presence/absence of an accident in the flight (crash, unintended landing, collision, or the like), presence/absence of assistance from an operation assistant, operation ability level, operation assistance ability level, and the like. As described above, since each operator can possibly serve as an operation assistant, for an operator (the operator of "U001" in FIG. 7A) that has been involved in operation of aircraft 10 as an operation assistant in the past, an operation assistant ID ("H001" in FIG. 7A) that allows identification as an operation assistant is also assigned. Also, in history information indicating the presence of operation assistance, the operation assistant ID of the operation assistant is also included. For example, in FIG. 7A, an example is shown in which in the flight by the operator with the operator ID "U001" performed on "2017/1/16", the operation assistant with the operation assistant ID "H012" provides operation assistance. These items of history information are acquired in accumulation unit 208 by a report or the like from operator terminal 30 or the operator or operation assistant. The operation ability level and the operation assistance ability level are calculated by specification unit 209, and will be described in detail below.

Specification unit 209 specifies a candidate to be the operation assistant who assists an operation planned by an assisted operator, based on the history information accumulated by accumulation unit 208. Specifically, specification unit 209 obtains the operation ability level and the operation assistance ability level of each of the operators based on the history information accumulated by accumulation unit 208, and specifies an operator having an operation assistance ability level corresponding to the operation ability level of the assisted operator as the candidate to be the operation assistant.

The operation ability level and operation assistance ability level are obtained based on a plurality of viewpoints. The viewpoints mentioned here include, for example, for flights when the operator operated aircraft 10, the flight time, the flight distance, the number of flights, the number and time of high-altitude flights, the number and time of flights with image capturing, the number and time of flights in strong wind, the number and time of flights while the operator traveled by vehicle, or the like. From the flight history of these viewpoints, an operation ability level and an operation assistance ability level are calculated by a predetermined algorithm. This algorithm is an algorithm such that a higher operation ability level and a higher operation assistance ability level are calculated for increasing amounts of the flight time, the flight distance, the number of flights, the number and time of high-altitude flights, the number and time of flights with image capturing, the number and time of flights in strong wind, and the number and time of flights while the operator traveled by vehicle or the like. Also, the algorithm for calculating the operation assistance ability level places more importance on a flight history having a high degree of difficulty (for example, the number and time of high-altitude flights, the number and time of flights with image capturing, the number and time of flights in strong wind, and the number and time of flights while the operator traveled by vehicle or the like) than the algorithm for calculating the operation ability level. Additionally, the history information of flights when an operation assistant performed operation assistance also relates to the determination of the operation ability level and the operation assistance ability level of that operation assistant. For example, in FIG. 7A, because the operation assistant with the operation assistant ID "H012" provides operation assistance in the flight of "2017/1/16", the flight time, the flight distance, the number of flights, the number and time of high-altitude flights, the number and time of flights with image capturing, the number and time of flights in strong wind, and the number and time of flights while the operator traveled by vehicle or the like that are included in the history information of "2017/1/16" relate to the determination of the operation ability level and the operation assistance ability level of the operation assistant with the operation assistant ID "H012" (this person also being an operator). In this case, the algorithm for calculating the operation ability level and the operation assistance ability level also, same as above, is an algorithm such that a higher operation ability level and a higher operation assistance ability level are calculated for increasing amounts of the flight time, the flight distance, the number of flights, the number and time of high-altitude flights, the number and time of flights with image capturing, the number and time of flights in strong wind, and the number and time of flights while the operator traveled by vehicle or the like.

Here, the highest level is 10 and the lowest level is 1 for both the operation ability level and the operation assistance ability level. In the example of FIG. 7A, the operator with the operator ID "U001" has an operation ability level of "6" and an operation assistance ability level of "4". As described above, an operator (operation assistant) having an operation assistance ability level corresponding to the operation ability level of the assisted operator is specified. For example, when the operation ability level of the assisted operator is "5", an operator (operation assistant) having an operation assistance ability level of "6" or more, which is higher than "5", is specified. Thus, for example, an operation assistant candidate of a higher level is specified for an operator who is skilled at operation, and an operation assistant candidate of a lower level is specified for a beginner operator. Note that, the correspondence between the operation ability level of the assisted operator and the operation assistance ability level of the operation assistant is arbitrarily determined. For example, an operator (operation assistant) having the same operation assistance ability level as the assisted operator may be specified, and other examples are also possible.

Output unit 210 outputs information regarding the operation assistant candidate specified by specification unit 209. In addition, output unit 210 generates information regarding the value of the operation assistance by the operation assistant, and outputs the generated information to assistant communications device 70 or operator communications device 60 for the assisted operator. FIG. 7B is a diagram showing an example of a value table, and this value table is stored by output unit 210. In the example of FIG. 7B, a value per unit of time required for assistance is determined for each operation assistance ability level of the operation assistant. Output unit 210 outputs information including a value corresponding to the operation assistance ability level of the specified operation assistant to assistant communications device 70 or operator communications device 60 for the assisted operator.

Storage unit 211 stores conditions of assistance between the assisted operator and the operation assistant. The assistance conditions mentioned here are a group of attributes of a planned flight, such as a flight planned date and time, an aircraft model, a flight purpose, a flight planned time, a flight planned route, a predicted value of a flight environment, a flight planned pattern, an image application which is the application of flight image capturing data captured during that flight, a value for assistance, and the like. When the operation to be performed by the assisted operator does not match the assistance conditions stored in storage unit 211, release unit 212 performs processing to release the operation assistance by the operation assistant. Specifically, release unit 212 acquires the details of the operation to be performed by the assisted operator from operator terminal 30, and if that content does not match the assistance conditions stored in storage unit 211, assistant communications device 70 or operator communications device 60 of the assisted operator is notified of suspension of the operation assistance. By adopting this sort of configuration, it is possible to prevent performing operation assistance different from the original plan.

When operation by the assisted operator is started, operator assistance control unit 201 acquires the aircraft viewpoint image captured by image capturing device 16 mounted on aircraft 10 through operator terminal 30. In addition, operation assistance control unit 201 acquires, from image capturing device 40, an operator viewpoint image in which the manner of flight by aircraft 10 is captured by image capturing device 40. Operation assistance control unit 201 preferentially displays any of the acquired aircraft viewpoint image or the operator viewpoint image in assistant terminal 50. In addition, operation assistance control unit 201 displays information regarding flight of aircraft 10 in flight in assistant terminal 50. Operation assistance control unit 201 transmits assistance information corresponding to the content of the operation performed by the operation assistant in assistant terminal 50 to operator terminal 30. The assistance information is, for example, voice-based or textual advice or instruction from the operation assistant to the operator, or a command that controls flight itself of aircraft 10. When the assistance information is a command, the flight is directly controlled by operator terminal 30 transmitting a command received from operation assistance control unit 201 of server device 20 to aircraft 10.

FIG. 8 is a diagram showing an example of a display image determination table in which conditions for determining which of the aircraft viewpoint image and the operator viewpoint image are to be preferentially displayed in assistant terminal 50 are described. This display image determination table is stored in operation assistance control unit 201. Operation assistance control unit 201 determines a captured image to be displayed preferentially based on information regarding flight of aircraft 10, but in the present embodiment in particular, determines a captured image to be displayed preferentially based on the state of aircraft 10 during flight.

Here, the state during flight includes a state detected by sensor 18 of aircraft 10, for example, the altitude, speed, attitude, remaining battery level, motor speed, and distance to the work target of aircraft 10. For example, when determining the captured image to be displayed based on the condition of altitude, when the altitude of aircraft 10 is at least a certain threshold H, the aircraft viewpoint image is displayed preferentially, and when the altitude is less than the threshold H, the operator viewpoint image is displayed preferentially. That is, when considering the condition of the altitude of aircraft 10, the captured image to be displayed preferentially is determined from the viewpoint of whether it is easier for the operation assistant to look at the aircraft viewpoint image to provide assistance or to look at the operator viewpoint image to provide assistance. From such a viewpoint, the captured image to be displayed preferentially is determined also for conditions other than the altitude, that is, the speed, attitude, battery level, motor speed, and distance to the work object of aircraft 10.

In the following description of operation, when aircraft 10 is described as a subject of processing, specifically, by reading predetermined software (a program) on hardware such as processor 11 and memory 12, by processor 11 performing an arithmetic operation to control communications by communications device 14, and data reading and/or writing in memory 12 and storage 13, processing is executed. The same applies to server device 20, operator terminal 30, and assistant terminal 50.

Figure 9:
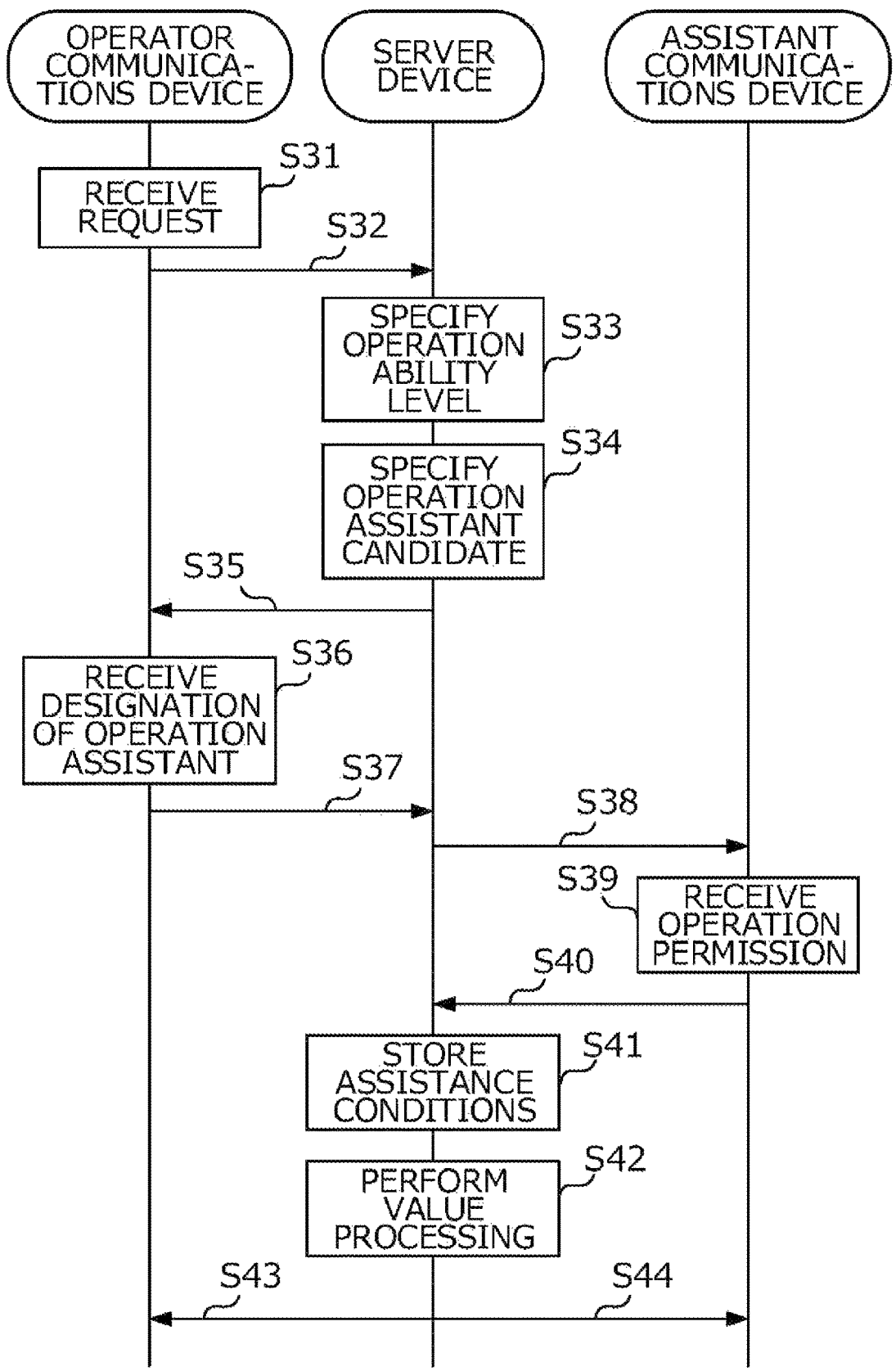
FIG. 9 is a sequence chart showing an example of an operation assistant determination operation in flight control system 1 in accordance with the present invention.

First, an example of an operation assistant determination operation in flight control system 1 will be described with reference to FIG. 9. In FIG. 9, the assisted operator uses their operator communications device 60 to input their own operator ID, a planned flight date and time and location, an aircraft model, a flight purpose, a flight planned time, a flight planned route, a predicted value of a flight environment, a flight planned pattern, an image application which is the application of flight image capturing data captured during that flight, and the like, and performs an operation of requesting presentation of an operation assistant candidate. Operator communications device 60 receives this request (step S31), and transmits a request including the input content to server device 20 (step S32).

Specification unit 209 of server device 20 searches the history information accumulated by accumulation unit 208 using the above-mentioned operator ID as a key, and specifies the operation capability level of the assisted operator (step S33). Specification unit 209 specifies an operator having an operation assistance ability level corresponding to the operation ability level of the assisted operator as an operation assistance candidate (step S34). Output unit 210 transmits, to operator communications device 60, information regarding the value of the operation assistance together with information regarding one or a plurality of operation assistant candidates specified by specification unit 209 (step S35). The information regarding the operation assistant candidates includes attributes such as the operator ID, gender, age, and the like of the operation assistant, flight history information, and also comments introducing the operation assistant.

The assisted operator designates a desired operation assistant from the information regarding the operation assistant candidates displayed in operator communications device 60. Operator communications device 60 receives this designation operation (step S36), and transmits the operator ID of the designated operation assistant to server device 20 (step S37).

Output unit 210 of server device 20 transmits, to assistant communications device 70 corresponding to the operator ID, the information regarding the assisted operator and the information regarding the value of the operation assistance (step S38). The information regarding the assisted operator includes attributes such as the operator ID, gender, age, and the like of the assisted operator, flight history information, and also comments introducing the assisted operator.

The operation assistant refers to the information displayed in assistant communications device 70 and, when permitting operation assistance, performs an operation to that effect. Assistant communications device 70 accepts this operation (step S39), and transmits the fact of that permission to server device 20 (step S40).

Storage unit 211 stores the conditions of assistance between the assisted operator and the operation assistant (step S41). The assistance conditions include a flight planned date and time, an aircraft model, a flight purpose, a flight planned time, a flight planned route, a predicted value of a flight environment, a flight planned pattern, an image application which is the application of flight image capturing data captured during that flight, and a value or the like. Release unit 212 performs processing regarding the value, that is, payment processing of the value from the assisted operator to the operation assistant using a credit card or a bank withdrawal or the like (step S42). Then, output unit 210 of server device 20 transmit the fact that the operation assistance matching has been completed to operator communications device 60 and assistant communications device 70 (steps S43 and S44).

Figure 10:
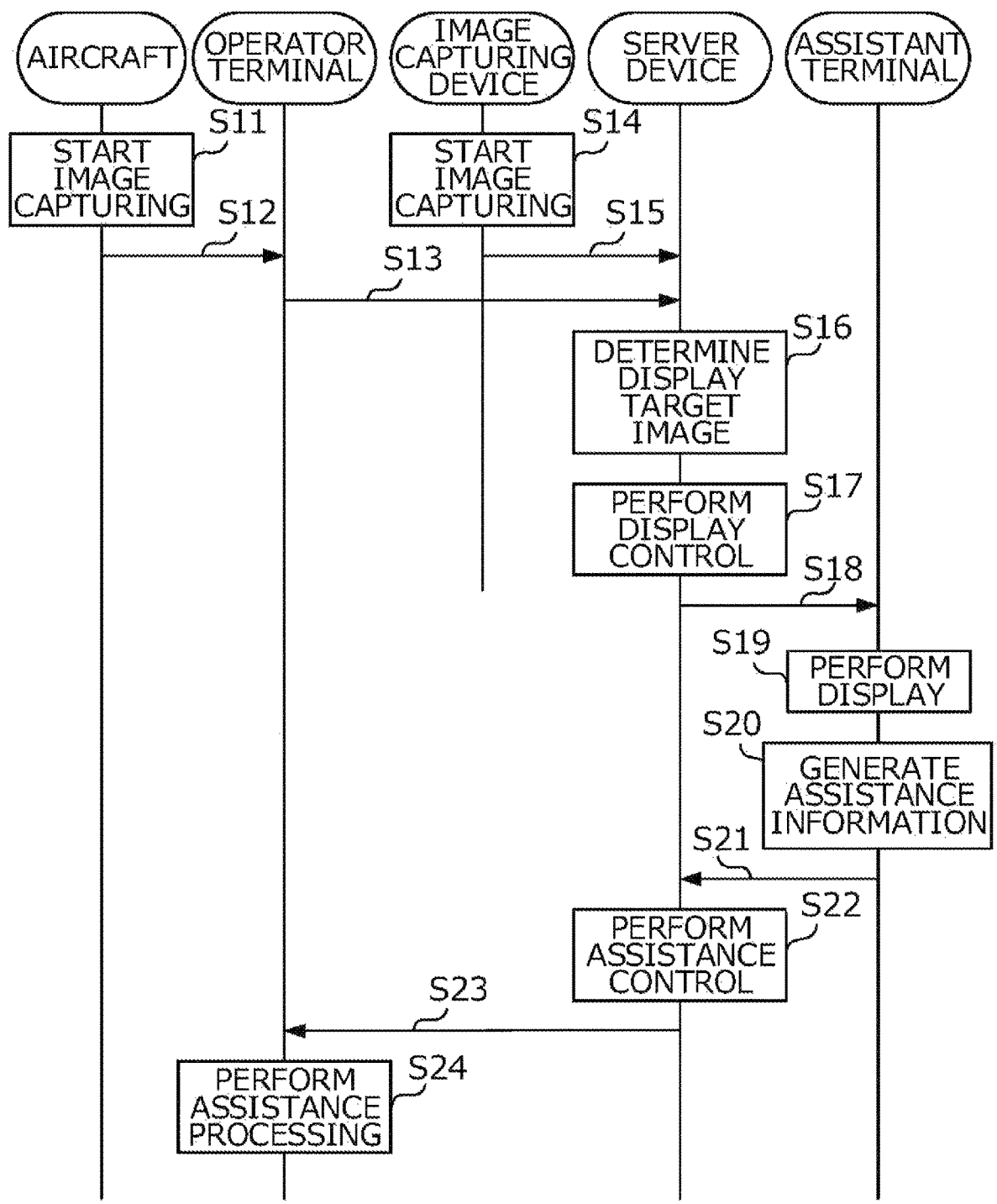
FIG. 10 is a sequence chart showing an example of an operation assistance operation in flight control system 1 in accordance with the present invention.

Next, an example of an operation assistance operation in flight control system 1 will be described with reference to FIG. 10. In FIG. 10, when aircraft 10 starts flying due to operation by the assisted operator, image capturing device 16 of aircraft 10 starts image capturing (step S11). The moving image data of the captured image thus captured is wirelessly transmitted from communications device 14 of aircraft 10 to operator terminal 30 (step S12). At this time, aircraft 10 wirelessly transmits, from communications device 14 to operator terminal 30, information regarding flight detected by positioning device 15 and sensor 18 (date and time, the position of aircraft 10, the altitude of aircraft 10, the speed of aircraft 10, the attitude of aircraft 10, the remaining battery level of aircraft 10, the motor speed of aircraft 10, the distance between aircraft 10 and a work target, and the like). Operator terminal 30 transmits the moving image data of the captured image received from aircraft 10 and information regarding the flight to server device 20 (step S13). Note that the information that can be generated by operator terminal 30 among the information regarding the flight (for example, date and time) may be generated by operator terminal 30 and transmitted to server device 20.

On the other hand, image capturing device 40 starts image capturing in response to an image capturing start operation by the operator (step S14). The moving image data of the captured image is transmitted from image capturing device 40 to server device 20 (step S15). Thereby, operation assistance control unit 201 of server device 20 acquires the moving image data of the captured image (the aircraft viewpoint image) and information regarding the flight from image capturing device 16, and operation assistance control unit 201 of server device 20 acquires the moving image data of the captured image (the operator viewpoint image) from image capturing device 40.

Operation assistance control unit 201 of server device 20 determines the captured image to be displayed in assistant terminal 50 with reference to a display target determination table and the information regarding the flight (step S16). Specifically, in the display target determination table, operation assistance control unit 201 applies the information regarding the flight that was acquired, and determines a captured image corresponding to the information as the image to be displayed. At this time, the captured image determined according to the respective conditions may be different. For example, it may be that the display target determined by focusing on the condition of altitude is the aircraft viewpoint image, and the display target determined by focusing on the condition of speed is the operator viewpoint image. In such a case, for example, the captured image having the larger number determined for each condition may be set as the display target. Further, the captured image to be displayed may be determined by assigning a weighting for each condition. For example, it may be that a display target determined by focusing on the condition of altitude is weighted by 1.1 times, and a display target determined by focusing on the condition of speed is weighted by 1.3 times.

Then, operation assistance control unit 201 of server device 20 performs display control in which, by transmitting the moving image data of the captured image determined to be the display target to assistant terminal 50, the captured image is preferentially displayed in assistant terminal 50 (steps S17 and S18).

Assistant terminal 50 displays an image corresponding to the moving image data of the captured image determined to be the display target (step S19). The operation assistant operates assistant terminal 50 while viewing the image. Assistant terminal 50 generates assistance information such as voice-based or textual advice or instruction for the operator, commands for controlling the flight of aircraft 10, and the like in response to the operation by the operation assistant (step S20), and transmits this information to server device 20 (step S21). Operation assistance control unit 201 performs assistance control processing by transmitting the assistance information to operator terminal 30 (steps S22 and S23). Operator terminal 30 outputs the assistance information and performs processing of assisting the flight operation of aircraft 10 (step S24). That is, operator terminal 30 outputs advice or instruction by voice or text for the assisted operator from the UI unit, or transmits a command to aircraft 10 from the first communications device.

According to the embodiment described above, it is possible to match the operator who operates aircraft 10 with the operation assistant who assists that operation. Further, an image appropriate for the operation assistance is preferentially displayed to the operation assistant, so the operation assistance can be easily performed from a remote location.

The present invention is not limited to the above-described embodiment. The embodiment described above may be modified as follows. Further, two or more of the following modifications may be combined.

In the above embodiment, specification unit 209 obtains the operation ability level and the operation assistance ability level of each operator based on the history information of each operator accumulated by accumulation unit 208, and specifies an operator having an operation assistance ability level corresponding to the operation ability level of the assisted operator as the candidate operation assistant, but the method of specifying the candidate operation assistant is not limited to this. For example, a configuration may also be adopted in which specification unit 209 obtains the operation assistance ability level of each operator based on the history information of each operator accumulated by accumulation unit 208, and specifies the candidate operation assistant in ascending order of their operation assistance ability level.

Output unit 210 may preferentially output a plurality of operation assistant candidates specified by specification unit 209 in order according to the flight conditions in operation planned by the assisted operator. The flight conditions mentioned here include, for example, the aircraft model, the flight purpose, the flight time, the flight path (three-dimensional position information including height), the flight environment (wind speed, temperature, humidity, and the like), the flight pattern (destination flight type, tour type, vertical movement type, and the like), the image application which is the application of flight image capturing data captured during flight, the number of accidents, and the like. Specification unit 209 specifies the operation assistance ability level of the operation assistant for each of these flight conditions. Thus, for one operator (operation assistant candidate), an operation assistance ability level is determined for each of the aircraft model, the flight purpose, the flight time, the flight path (three-dimensional position information including height), the flight environment (wind speed, temperature, humidity, and the like), the flight pattern (destination flight type, tour type, vertical movement type, and the like), the image application which is the application of flight image capturing data captured during flight, the number of accidents, and the like. Thus, in a case where accidents must be avoided such as a flight for photographing a cultural property, for example, an operation assistant candidate with a small number of accidents can be output preferentially. Here, displaying preferentially means displaying the display target to be displayed preferentially so that a user can easily, or in an easily understood manner, view the display target compared to another display target. For example, this includes a mode in which a display target to be displayed preferentially is displayed and another display target is not displayed, a mode in which a display target to be displayed preferentially is displayed larger than another display target, a mode in which a display target to be displayed preferentially is displayed earlier in time than another display target, or a mode in which a display target to be displayed preferentially is displayed visually emphasized more than another display target. That is, the operation assistance ability level of the operation assistant is determined for each of the plurality of flight conditions, and specification unit 209 specifies an operation assistant candidate based on an operation assistance ability level corresponding to the flight conditions in the operation planned by the assisted operator.

As in the above embodiment, a configuration may be adopted in which the operation ability level of the assisted operator is determined for each of the plurality of flight conditions, and specification unit 209 specifies an operation assistant candidate based on the operation ability level corresponding to the flight conditions in the operation that the assisted operator is planning. That is, for one operator (assisted operator), an operation ability level is determined for each of the aircraft model, the flight purpose, the flight time, the flight path (three-dimensional position information including height), the flight environment (wind speed, temperature, humidity, and the like), the flight pattern (destination flight type, tour type, vertical movement type, and the like), the image application which is the application of flight image capturing data captured during flight, the number of accidents, and the like. In a case where, for example, an assisted operator having an operation ability level of "2" for flight with photography and an operation ability level of "4" for flight with strong winds performs an operation for flight with photography, specification unit 209 specifies an operator (operation assistant) having an operation assistance ability level of "3" or more, which is higher than "2", and when this assisted operator performs an operation for flight with strong winds, specification unit 209 specifies an operator (operation assistant) having an operation assistance ability level of "5" or more, which is higher than "4".

Accumulation unit 208 may accumulate, as the history information, information regarding evaluation from the assisted operator to the operation assistant, or information regarding evaluation from the operation assistant to the assisted operator. Further, specification unit 209 may specify the operation ability level or the operation assistance ability level using this evaluation.

Specification unit 209 may specify an operation assistant candidate for each operation technique included in the operation planned by the assisted operator. Specifically, in a case where, for example, an assisted operator having an operation ability level of "2" for flight with photography and an operation ability level of "4" for flight with strong winds performs an operation for flight in strong winds while performing photography, specification unit 209 specifies an operator (operation assistant) having an operation assistance ability level of "3" or more, which is higher than the operation ability level of "2", in order to assist photography, and specifies an operator (operation assistant) having an operation assistance ability level of "5" or more, which is higher than the operation ability level of "4", in order to assist flight in strong winds. In a case where a plurality of operation assistants exist for one assisted operator, that is, in a case where there are a plurality of assistant terminals 50, operation assistance control unit 201 determines the captured image to be preferentially displayed according to the method determined for each assistant terminal 50. For example, when a first assistant terminal 50 is a terminal for assisting flight of aircraft 10 by the operator and a second assistant terminal 50 is a terminal for assisting photography from aircraft 10 by the operator, the first assistant terminal 50 preferentially displays an operator viewpoint image which is more useful for assisting flight, and the second assistant terminal 50 preferentially displays an aircraft viewpoint image which is more useful for assisting photography. Each operation assistant operates each assistant terminal 50 while viewing respective images according to their assistance purpose. By adopting such a configuration, operation assistance to one operator by a plurality of operation assistants can be realized.

The content of the operation assistance is not limited to the example given in the embodiment. Various methods can be adopted as the method of assistance. For example, the operation assistant may go to the location where the operator controls aircraft 10 to perform the operation assistance verbally or the like.

Any method may be used for tracking and image capturing aircraft 10. Further, the method of measuring the position of aircraft 10 is not limited to a method using a GPS, but may be any method. Further, aircraft 10 may be configured to be capable of communication through network 80, and aircraft 10 may communicate with server device 20 or assistant terminal 50 without passing through operator terminal 30.

The block diagrams used in the description of the above embodiment show blocks in functional units. These functional blocks (components) are realized by any combination of hardware and/or software. Further, the mechanism for realizing each functional block is not particularly limited. More specifically, each functional block may be realized by one physically and/or logically coupled device, or two or more devices physically and/or logically separated from each other directly and/or indirectly (for example, wired and/or wirelessly) may be coupled, and each functional block realized by a plurality of the devices. Further, at least some of the functions of server device 20 may be implemented in operator terminal 30 or assistant terminal 50. Similarly, at least some of the functions of operator terminal 30 or assistant terminal 50 may be implemented in server device 20.

The aspects/embodiments described in the present description may be employed to a system that uses LTE (Long Term Evolution), LTE-A (LTE-Advanced), SUPER3G, IMT-Advanced, 4G, 5G, FRA (Future Radio Access), W-CDMA (registered trademark), GSM (registered trademark), CDMA2000, UMB (Ultra Mobile Broadband), IEEE802.11 (Wi-Fi), IEEE802.16 (WiMAX), IEEE802.20, UWB (Ultra-WideBand), or Bluetooth (registered trademark), a system that uses another appropriate system, and/or a next-generation system that is an extension of any of the same.

The orders in the processing procedures, sequences, flowcharts, and the like of the aspects/embodiments described in the present description may be changed as long as no contradictions arise. For example, the methods explained in the present description show various step elements in an exemplified order, and are not limited to the specific order that is shown.

The aspects/embodiments described in the present description may also be used alone or in combination, or may also be switched when they are implemented. Furthermore, the notification of predetermined information (e.g., notification of "being X") is not limited to being performed explicitly, and may also be performed implicitly (for example, notification of the predetermined information is not performed).

The terms "system" and "network" used in the present description can be used in an interchangeable manner.

The information and the parameters described in the present description may also be expressed by absolute values, relative values with respect to a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The present invention may be provided as a flight control method that includes the processing steps performed in flight control system 1. Also, the present invention may be provided as a program for execution in server device 20, aircraft 10, operator terminal 30, or assistant terminal 50. This program may be provided in an aspect of being recorded on a recording medium such as an optical disk, or may be provided in an aspect of being downloaded to a computer via a network such as the Internet and being installed in the computer to become usable, for example.

Software, instructions, and the like may also be transmitted/received via a transmission medium. For example, if software is transmitted from a web site, a server, or another remote source using a wired technology such as a coaxial cable, an optical fiber cable, a twisted-pair wire, or a digital subscriber line (DSL), and/or a wireless technology using infrared light, radio waves, microwaves, or the like, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned throughout the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

All references to elements that have been given names such as "first" and "second" in the present description do not overall limit the number of such elements or the orders thereof. Such names may be used in the present description as a convenient method for distinguishing between two or more elements. Accordingly, references to first and second elements are not intended to mean that only two elements can be employed, or that the first element is required to come before the second element in some sort of manner.

The "means" in the configurations of the above-described apparatuses may be replaced by "unit", "circuit", "device", or the like.

The terms "including", "comprising", and other forms thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST

1 . . . Flight control system
10 . . . Aircraft
20 . . . Server device
21 . . . Processor
22 . . . Memory
23 . . . Storage
24 . . . Communications device
200 . . . Tracking unit
201 . . . Operation assistance control unit
208 . . . Accumulation unit
209 . . . Specification unit
210 . . . Output unit
211 . . . Storage unit
212 . . . Release unit
30 . . . Operator terminal
40 . . . Image capturing device
50 . . . Assistant terminal
60 . . . Operator communications device
70 . . . Assistant communications device

The invention claimed is:

1. A flight control system for controlling the flight of an aircraft, the flight control system comprising:
  a processor configured to:
    accumulate history information regarding a flight history of operation of an aircraft by each of an assisted operator and at least one operation assistant, wherein the at least one operation assistant operates the aircraft remotely from the assisted operator;
    specify, based on the accumulated history information, a candidate to be the operation assistant to assist the assisted operator in the operation of the aircraft; and transmit, to the assisted operator, candidate information regarding the specified candidate to be the operation assistant in the operation of the aircraft;

receive acceptance, from the assisted operator, of a designation of the candidate as a designated operation assistant;

receive assistance information from the designated operation assistant for assisting with the flight operation of the aircraft; and generate and transmit, to the assisted operator, a flight control command based on the assistance information received from the designated operation assistant;

an assistant terminal operated by the designated operation assistant configured to:

generate and transmit, to the processor, the assistance information based on operational input to the assistant terminal by the designated operation assistant; and an operator terminal operated by the assisted operator configured to:

receive the flight control command from the processor; and control the flight of the aircraft in accordance with the flight control command received from the processor.

2. The flight control system according to claim 1, wherein the processor is further configured to:

determine an operation ability level of the assisted operator and an operation assistance ability level of the at least one operation assistant based on the accumulated history information; and specify an operation assistant who has an operation assistance ability level corresponding to the operation ability level of the assisted operator as the candidate to be the operation assistant.

3. The flight control system according to claim 1, wherein an operation assistance ability level of the at least one operation assistant is determined for each of a plurality of flight conditions of the aircraft, and wherein the specified candidate to be the operation assistant is based on an operation assistance ability level corresponding to a flight condition in the operation of the aircraft planned by the assisted operator.

4. The flight control system according to claim 1, wherein an operation ability level of the assisted operator is determined for each of a plurality of flight conditions of the aircraft, and wherein the specified candidate to be the operation assistant based on an operation ability level corresponding to a flight condition in the operation of the aircraft planned by the assisted operator.

5. The flight control system according to claim 1, wherein the processor is further configured to specify a plurality of candidates to be the operation assistant, in an order according to a flight condition of the aircraft in the operation planned by the assisted operator.

6. The flight control system according to claim 1, further comprising:

a storage medium that stores an assistance condition of assistance between the assisted operator and the at least one operation assistant; and wherein the processor is further configured to perform processing to release operation assistance by the designated operation assistant, when an operation to be performed by the assisted operator does not match the assistance condition stored in the storage medium.

7. The flight control system according to claim 1, wherein the processor is further configured to generate information regarding a value of operation assistance by the at least one operation assistant, and output the generated information to a communications device of the at least one operation assistant or the assisted operator.

8. The flight control system according to claim 1, wherein the history information includes information regarding evaluation from the assisted operator to the at least one operation assistant, or information regarding evaluation from the at least one operation assistant to the assisted operator.

9. The flight control system according to claim 1, wherein the processor is further configured to specify candidate to be the operation assistant for each operation technique included in the operation planned by the assisted operator.

10. The flight control system according to claim 1, wherein the flight history of operation of the aircraft by each of the assisted operator and the at least one operation assistant includes at least one of a flight time of the aircraft, a flight distance of the aircraft, a number of flights of the aircraft, a number of flights or a flight time of the aircraft at high altitude, a number of flights or a flight time of the aircraft while capturing an image, a number of flights or a flight time of the aircraft in strong wind, and a number of flights or a flight time of the aircraft while an operator travels by a vehicle.

11. The flight control system according to claim 1, wherein the aircraft is a drone.

12. The flight control system according to claim 1, further comprising:

an image capturing device, operable to change imaging direction, for capturing moving images associated with the aircraft in flight; and wherein the processor is further configured to:

receive the moving images;

control the imaging direction of the imaging capturing device, using image recognition technology, to track the aircraft to capture the image of the aircraft;

transmit the captured moving image to the assistant terminal; and wherein the assistant terminal is further configured to:

receive the captured moving image; and display the captured moving image to the designated operation assistant to assist with the operation of the aircraft by the designated operation assistant.

\* \* \* \* \*